H. W. CHENEY.
METERING MOTOR.
APPLICATION FILED MAR. 29, 1917.
1,392,115.
Patented Sept. 27, 1921.
4 SHEETS—SHEET 1.
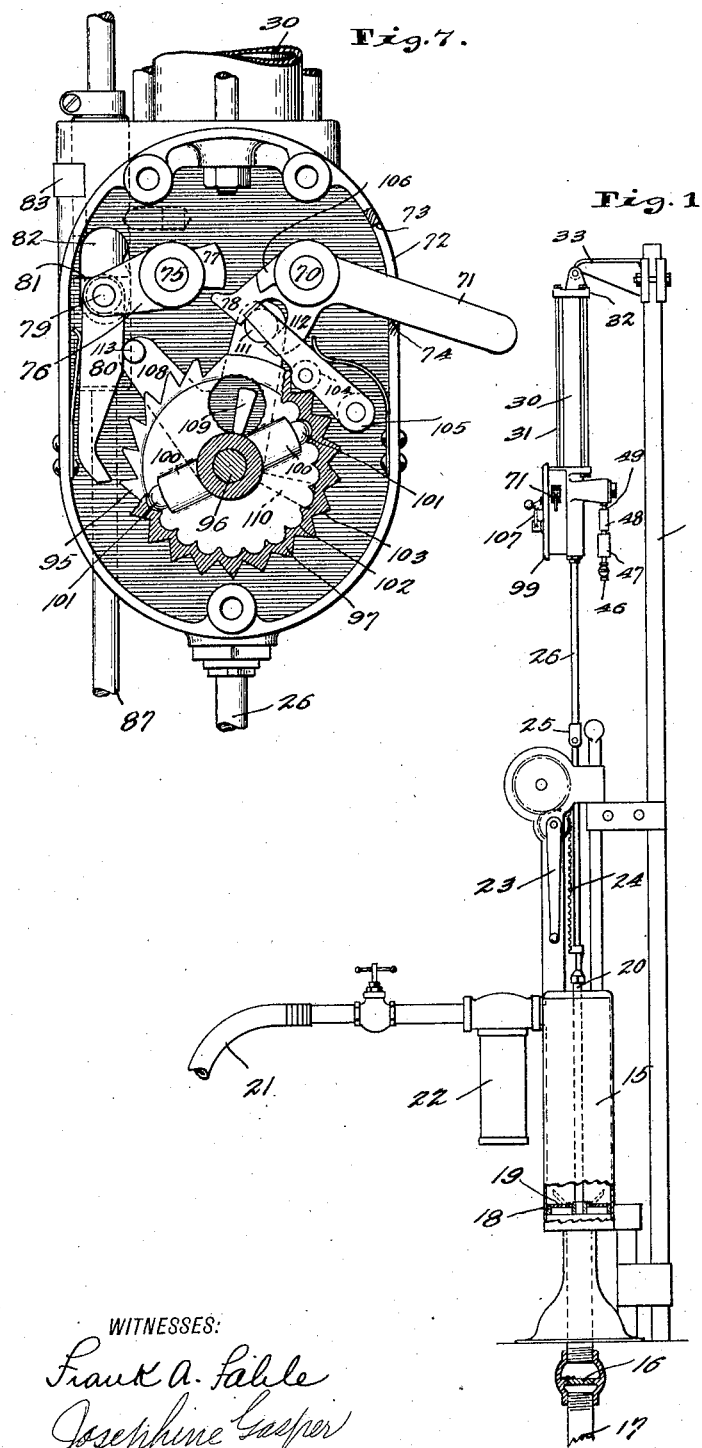
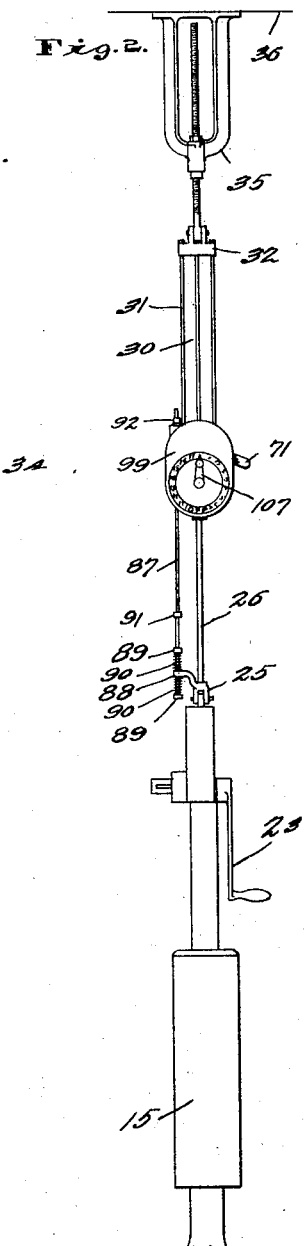
INVENTOR
Herbert W. Cheney,
BY
ATTORNEYS

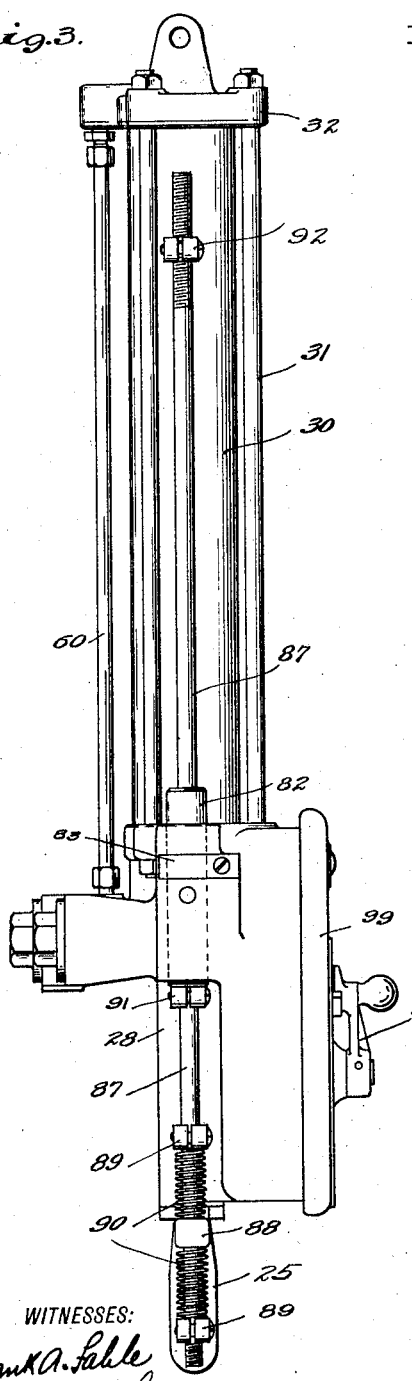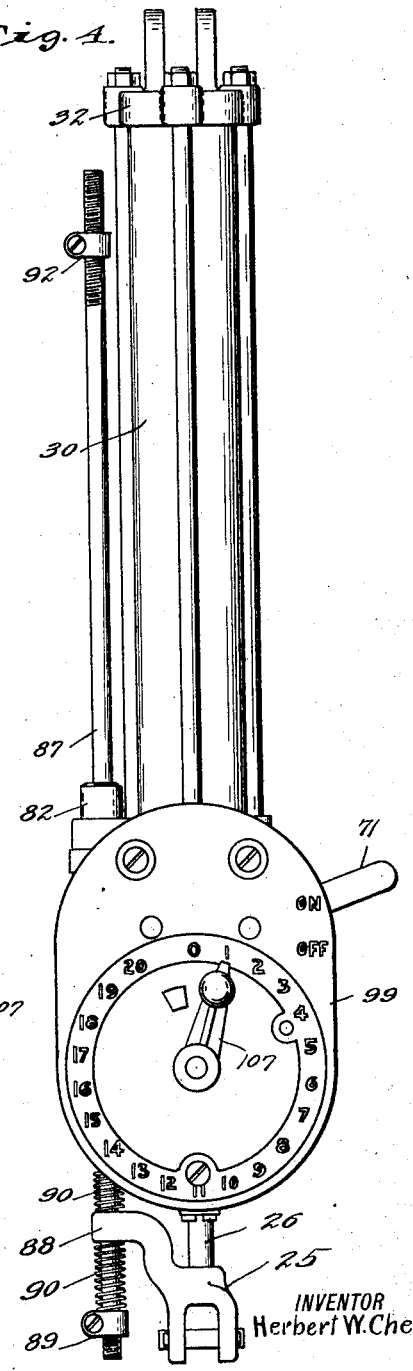

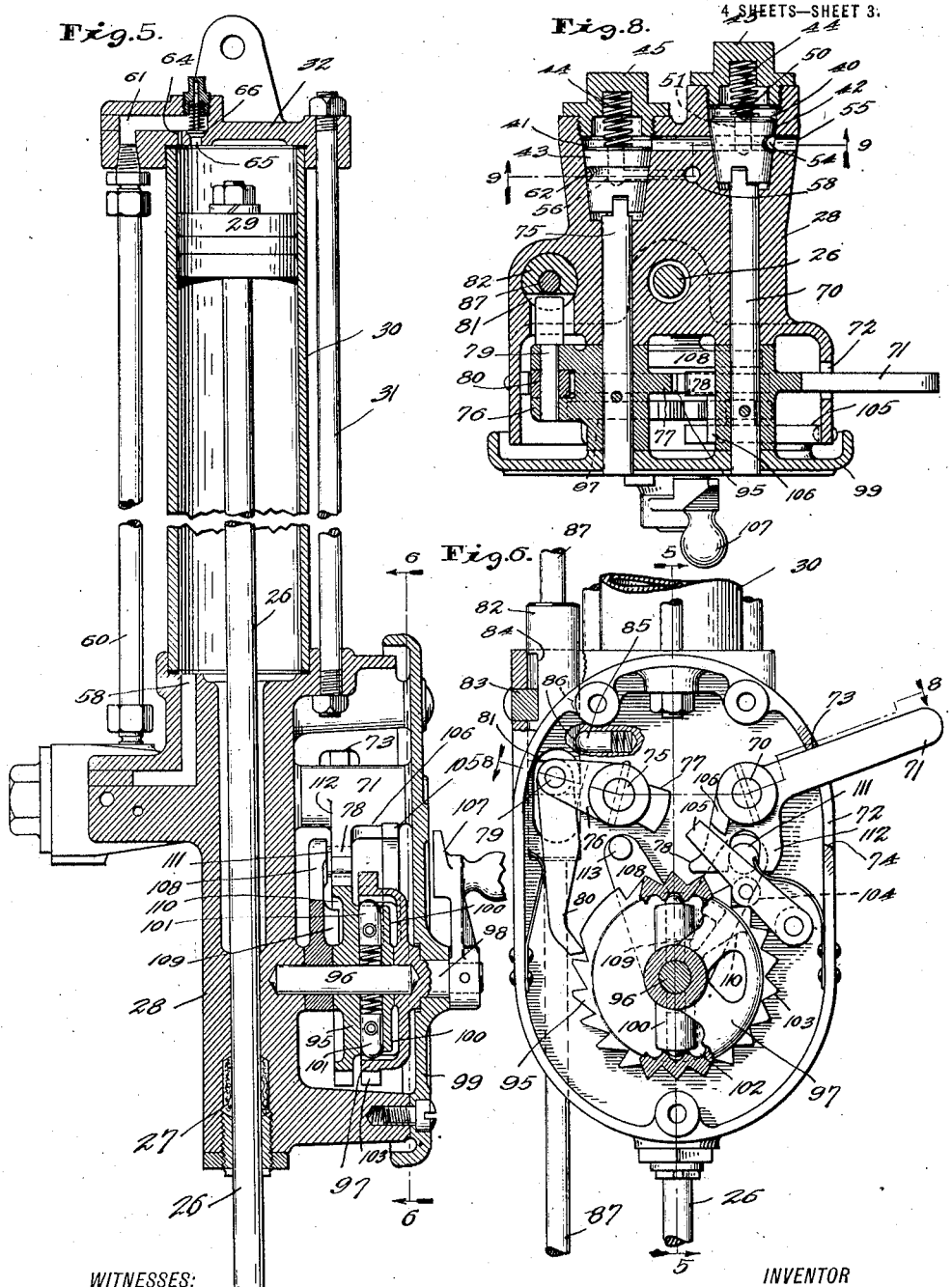

H. W. CHENEY.
METERING MOTOR.
APPLICATION FILED MAR. 29, 1917.
1,392,115.
Patented Sept. 27, 1921.
4 SHEETS—SHEET 4.
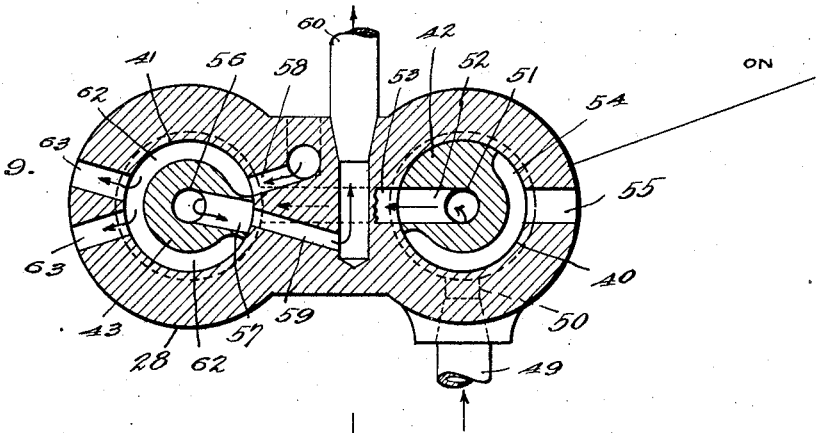
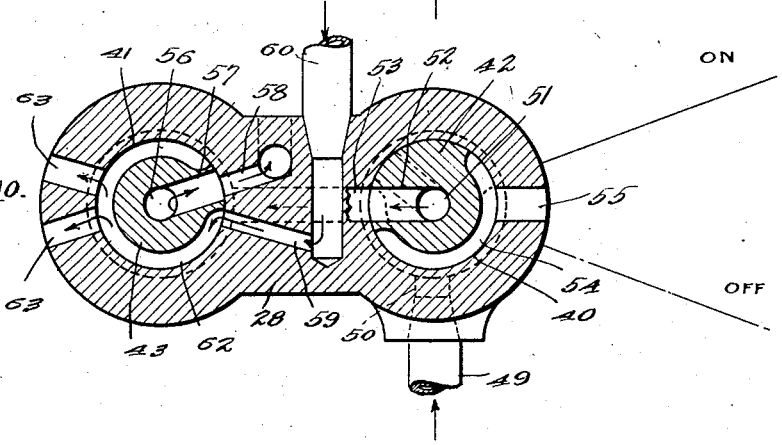
WITNESSES:
Frank A. Fahle
Josephine Gasper
INVENTOR
Herbert W. Cheney,
BY
Hood & Selby.
ATTORNEYS

UNITED STATES PATENT OFFICE.

HERBERT W. CHENEY, OF MILWAUKEE, WISCONSIN.

METERING-MOTOR.

1,392,115.  Specification of Letters Patent.  Patented Sept. 27, 1921.

Application filed March 29, 1917. Serial No. 158,294.

*To all whom it may concern:*

Be it known that I, HERBERT W. CHENEY, a citizen of the United States, residing at Milwaukee, in the county of Milwaukee and State of Wisconsin, have invented a new and useful Metering-Motor, of which the following is a specification.

It is the object of my invention to provide a motor which when started into operation will operate any desired number of times, which number may readily be varied, and will then stop automatically; and particularly a reciprocating fluid pressure motor which will take a certain number of strokes, variable as desired, and then stop automatically. A further object of my invention is to provide a simple interlocking mechanism to prevent a change of setting while the device is in operation. A further object of my invention is to associate such a motor with a pump, whereby by proper setting of the motor the pump may be caused to operate to discharge any desired amount of fluid, and to stop automatically when such desired amount has been discharged. More particularly, my invention is applicable to metering pumps, such as are used in dispensing gasolene. Such pumps are used in garages and service stations and have usually been hand-operated, requiring considerable labor for their operation, especially when the gasolene is discharged at a considerable distance from the storage receptacle. Compressed air is usually obtainable at such garages and service stations, and my invention provides a simple, inexpensive, and reliable means for operating the gasolene pumps by power by the use of this already obtainable compressed air.

My invention is illustrated in the accompanying drawings. Figure 1 is a side elevation of a gasolene pump equipped with a motor embodying my invention, showing a self-contained mounting; Fig. 2 is a front elevation of such pump and operating motor, but with the motor suspended from the ceiling; Fig. 3 is a side elevation, on a larger scale, of the motor shown in Fig. 1, but it is taken from the opposite side from that on which Fig. 1 is taken; Fig. 4 is a front elevation of such motor on the same scale as Fig. 3; Fig. 5 is a vertical longitudinal section through such motor, being taken substantially on the line 5—5 of Fig. 6; Fig 6 is a section on the line 6—6 of Fig. 5, or is a front view of the controlling mechanism of the motor with the cover removed to show the working parts, with the parts in the position which they would occupy when the motor piston is at the beginning of the last downward stroke before producing the automatic stopping; Fig. 7 is a view similar to Fig. 6, but with the parts in the position they would occupy with the power off and the parts set ready for the start of an operation involving five complete strokes; Fig. 8 is a section on the line 8—8 of Fig. 6; Fig. 9 is a section on the line 9—9 of Fig. 8, with the power on and the direction-controlling valve in position to cause a down-stroke; and Fig. 10 is a view similar to Fig. 9, with such direction-controlling valve in position to cause an up-stroke, also showing in dotted lines the main valve in " off " position.

My invention may be applied to any ordinary gasolene metering pump. Such a pump usually comprises a pump cylinder 15, which is the measuring cylinder and is connected at the bottom through a suitable lift valve 16 to a pipe 17 leading from the storage receptacle, and a suitable pump piston 18 provided with suitable valve 19 and mounted on the lower end of a piston rod 20, so that by the reciprocation of such piston rod and piston gasolene is lifted from the storage receptable and discharged through the discharge pipe 21, preferably after first passing through a filter 22. In the ordinary gasolene pump, the piston rod 20 is reciprocated by the turning of an operating crank 23, suitably connected through gearing including a rack 24 to the piston rod 20.

According to my present invention, I make the manual reciprocation of the piston rod 20 by the crank 23 unnecessary. To this end, I connect the upper end of the pump piston rod 20 to the lower forked end 25 of a motor piston rod 26. This piston rod 26 passes with a sliding fit through a packing gland 27 in a main frame 28 to the motor piston 29, mounted for reciprocation in a cylinder 30 clamped by rods 31 between an upper cylinder head 32 and the frame 28, which forms the lower cylinder head and also carries the control mechanism. The upper cylinder head 32 is suitably suspended in proper relation to the gasolene pump, as by being hung from a bracket 33 on the upper end of an upright 34, as in Fig. 1, or from a bracket 35 attached to the ceiling 36, as in Fig. 2.

Seated in a main valve cavity 40 and a direction-controlling valve cavity 41 are a main valve 42 and a direction-controlling valve 43, which are of the tapered plug type held tightly seated by springs 44 and removable valve caps 45. The compressed air or other fluid pressure is supplied from any suitable source through a stop cock 46, an air strainer 47, and any other suitable air-treating device, such as a lubricator 48, to the intake pipe 49 leading to an air inlet opening 50 communicating with the main valve cavity 40 beyond the large end of the tapered valve 42. This tapered valve has a central passage 51 and a communicating radial passage 52 which registers with a passage 53 in the main frame 28 when the valve 42 is in the "on" position, shown in full lines in Figs. 9 and 10; and has a circumferential passage 54 which when the valve 42 is moved to the position shown in dotted lines in Fig. 10 connects such passage 53 to an air-outlet opening 55 leading through the main frame 28 to the atmosphere. The passage 53 communicates with the direction-controlling valve cavity 41 beyond the large end of the tapered valve 43. This tapered valve has a central passage 56 and a communicating radial passage 57, which when the valve is in the two positions shown in Figs. 9 and 10 communicates respectively with a passage 58 leading through the main frame 28 into the lower end of the cylinder 30 and with a passage 59 communicating through a pipe 60 with a passage 61 in the upper cylinder head 32; and also has a circumferential passage 62 which when the valve is in such two positions respectively connects the passage 59 and 58 with outlet openings 63 leading through the main frame 28 to the atmosphere. The passage 61 in the upper cylinder head 32 communicates with the upper end of the cylinder 30. Since more power is required for raising the pump piston 18 than for lowering it, this communication from the passage 61 to the cylinder 30 is through an always open restricted opening 64, and through a larger opening 65 closed by a check valve 66 which permits fluid flow from the cylinder 30 to the passage 61 through the opening 65 but prevents such flow in the opposite direction so that air is supplied to the upper end of the cylinder 30 only through the opening 64 but is discharged therefrom through both openings 64 and 65.

The main valve 42 has an axially releasable connection with a main valve stem 70, provided with an operating handle 71 projecting laterally therefrom through a slot 72 in the main frame 28, the two ends 73 and 74 of such slots forming stops which stop the movement of the handle and its valve when definite "on" and "off" positions are reached. The direction-controlling valve 43 has a similar axially releasable connection with a direction-controlling valve stem 75, provided with an operating lever 76 projecting laterally therefrom. The lever 76 is provided with a tail 77 coöperating with a toe 78 on the handle 71 to prevent such handle 71 from being thrown completely against the stop 74 save when the direction-controlling valve 43 is in the position shown in Fig. 10, to produce an up-stroke of the piston 29, at which time the tail 77 is in the position shown in Fig. 7; though when such tail is in the position shown in Fig. 6 (with the direction-controlling valve in the position shown in Fig. 9, to produce a down-stroke,) the handle 71 may be moved sufficiently close to the stop 74 to shut off the air supply to the passage 53. The end of the lever 76 is provided with a cross pin 79, which provides a pivot pin for a pawl 80 (of which more hereafter), and also projects into a transverse slot 81 in a sliding sleeve 82 slidable in the main frame 28 in a direction parallel to the piston rod 26 and transverse to the valve rods 70 and 75. The movement of the sleeve 82 is limited by a stop 83, projecting from the frame 28 into a short longitudinal slot 84 in such sleeve, the coöperation of such stop and slot serving also to prevent the sleeve 82 from turning. A spring detent 85 coöperating with notches 86 in this sleeve 82 serves to hold the latter from accidental displacement from either extreme position. A shift rod 87 projects longitudinally through the sleeve 82, and also projects through an ear 88 on the forked end 25 of the motor piston rod 26, between which ear 88 and two collars 89 fixed on the rod 87 are located compression springs 90 surrounding such rod. In consequence, the shift rod 87 moves up and down with the piston 29, the springs 90 providing a yieldable connection between the piston rod and shift rod to avoid jarring. The shift rod 87 carries two adjustable stops 91 and 92 respectively below and above the sleeve 82, which stops strike the sleeve 82 at the ends of the up and down strokes of the piston 29 to shift such sleeve from its lower to its upper position and from its upper to its lower position respectively, so that through the slot 81 and pin 79 the direction-controlling valve 43 is moved respectively from the up-stroke-producing position shown in Fig. 10 to the down-stroke-producing position shown in Fig. 9 and vice versa respectively, in either of which positions it is held by the detent 85 until the operation of the sleeve 82 in the other direction by the other stop. The pawl 80, which is reciprocated with the sleeve 82, coöperates with the teeth of a ratchet wheel 95, so as to turn the latter one step in a counter-clockwise direction (Figs. 6 and 7) on each downward movement of such sleeve 82. This ratchet wheel is shown in Fig. 6 in position for making one more step upon the next downward movement of the sleeve 82 and pawl 80 before producing automatic stopping of the device. The ratchet wheel 95 is loosely mounted on a pivot pin 96, the ends of which are journaled in the frame 28 and in a star wheel 97 having a pivotal extension 98 projecting through the removable cover 99 which covers the cavity provided in the frame 28 for parts shown in Figs. 6 and 7. The star wheel 97 is cup-shaped internally, so as to extend over an axially extending boss 100 of the ratchet wheel 91, in which boss 100 there are slidingly mounted two outwardly extending spring-pressed plungers 101 which coöperate with notches 102 on the inner face of the star wheel 97. The teeth 103 on the outer surface of the star wheel 97 coöperate with a roller 104 on a lever 105 spring-pressed toward such teeth, so as to position such star wheel. The angular spacings of the ratchet wheel 95 and of the inner and outer teeth 102 and 103 of the star wheel 97 are the same. The lever 105 coöperates with a stop 106 on the handle 71 so as to prevent outward swinging of such lever and thereby to prevent movement of the star wheel 97 save when the handle 71 and main valve 42 are in extreme "off" position. The outer end of the pivotal extension 98 of the star wheel 97 carries a setting handle 107, by which the ratchet wheel 95 through the star wheel 97 and plungers 101 may be set; but this can only be done when the handle 71 is in extreme "off" position because of the interlocking just described. A V-shaped lever 108 is also pivoted on the pin 96, below the ratchet wheel 95. This V-shaped lever is provided with an axially projecting finger 109 coöperating with a corresponding finger 110 on the under side of the ratchet wheel 95 to move such V-shaped lever from the position shown in Fig. 6 to the position shown in Fig. 7 upon the last and final step (shown as about to be taken in Fig. 6) of the ratchet wheel 95 by the pawl 80; with a pin 111 which projects between two fingers 112 from the arm 71 so as to throw such arm from the "on" position shown in Fig. 6 toward but not quite to the "off" position shown in Fig. 7 as such last step in the movement of the ratchet wheel 95 is obtained, yet sufficiently far to shut off the supply of air to the passage 53 and thus stop the operation of the motor; and a pin 113 which when the handle 71 is moved from the position to which it is thus automatically thrown to the extreme "off" position engages the pawl 80 and lifts it clear of the teeth of the ratchet wheel 95, as is shown in Fig. 7, this last movement of the handle 71 and V-shaped lever 108 being obtainable only if the direction-controlling valve 43 is in the up-stroke-producing position shown in Fig. 10, so that the tail 77 is out of the way of the toe 78.

The operation is as follows:

Assume that there has been a previous operation, and that the parts have returned to the automatic stop position, with the direction-controlling valve 43 in the position shown in Fig. 10, the handle 71 and main valve 42 in position to shut off the supply of air to the passage 53 though not quite to the extreme "off" position with the handle 71 against the stop 74, and the ratchet wheel 95 moved one step farther in a counterclockwise direction than the position shown in Fig. 6, or to the final position. The stop 110 is in engagement with the stop 109, and has moved the V-shaped lever 108 from the position shown in Fig. 6 almost to the position shown in Fig. 7, though not sufficiently far to lift the pawl 80 away from the teeth of the ratchet wheel 95. Upon such automatic stopping, the setting handle 107 is in some other than the "0" position. Before starting the next operation, the handle 71 is turned from the position it occupies to the extreme "off" position, shown in Fig. 7, thus swinging the V-shaped lever 108 farther in a clockwise direction and lifting the pawl 80 clear of the teeth of the ratchet wheel 95. Then the setting handle 107 and the star wheel 97 with it are moved back, or in a counterclockwise direction, to this "0" position. During this movement, the plungers 101 yield inwardly, and snap from one set of notches 102 to another until the "0" position is reached, the fingers 109 and 110 preventing the ratchet wheel 95 from being turned with such star wheel. Then the handle 107 and the star wheel 97 with it are turned in a clockwise direction until the handle registers a number corresponding to the desired number of strokes—say to the number 5 if each stroke of the piston 18 pumps one gallon of gasolene and five gallons is desired. In both movements of the setting handle 107 the lever 105 yields to allow the roller 104 to pass the teeth 105 until it occupies the proper notch. By reason of the engagement of the plungers 101 with the notches 102, and of the fact that the pawl 80 is now lifted from the teeth of the ratchet wheel, the ratchet wheel moves with the star wheel during this setting or clockwise movement of the latter. The setting of the ratchet wheel for such five gallons is shown in Fig. 7. When the desired setting has been accomplished, and the gasolene discharge pipe has been adjusted to discharge into the desired place, the handle 71 and therethrough the V-shaped lever 108 are moved from the position shown in Fig. 7 to the position shown in Fig. 6, thus permitting the pawl 80 to return to coöperative relationship with the teeth of the ratchet wheel 95, and turning the main valve 42 to the "on"

position shown in Fig. 9. Air is now supplied through the valves 42 and 43 (the latter being in the position shown in Fig. 10 because the sleeve 82 is in the lowermost position shown in Fig. 7) to the lower end of the cylinder 30, causing the motor piston 29 to rise to move the pump piston 18 upward. On this up-stroke, the air in the upper end of the cylinder 30 is discharged through the openings 64 and 65 into the passage 61, and from such passage through the pipe 60 and the passages 59, 62, and 63 to the atmosphere. When the pistons 29 and 18 reach the upper end of their up-stroke, the stop 91 strikes the sleeve 82 and moves it upward, to lift the pawl 80 into engagement with the next tooth of the ratchet wheel 95 and to turn the direction-controlling valve from the position shown in Fig. 10 to the position shown in Fig. 9. Then the down-stroke of the two pistons 29 and 18 occurs, air now being supplied to the upper end of the cylinder 30 and discharged from the lower end thereof; but the air supply to the upper end of the cylinder is restricted because of the seating of the check valve 66, since less power is required for the down-stroke because the gasolene movement occurs wholly on the up-stroke. When the end of the down-stroke is reached, the stop 92 strikes the upper end of the sleeve 82 and forces such sleeve downward. This returns the direction-controlling valve 43 to the position shown in Fig. 10 in readiness to produce another up-stroke and also causes the pawl 80 to turn the ratchet wheel 95 one step in the counterclockwise direction. However, upon this movement of the ratchet wheel 95 there is no corresponding movement of the star wheel 97, because of the interlocking of the lever 105 and stop 106. Another up and down stroke now occurs as before, and at the end of the down-stroke the ratchet wheel 95 is turned another step in a counterclockwise direction. This occurs a number of times equal to the number indicated by the setting of the handle 107. If the setting was for five strokes as indicated in Fig. 7, the shifting movement of the sleeve 82 caused at the end of the fifth and last down-stroke moves the ratchet wheel 95 from the position shown in Fig. 6 to a position one step farther in a counterclockwise direction, and the fingers 110 and 109 coöperate during this movement of the ratchet wheel to throw the V-shaped lever 108, the handle 71, and the main valve 42 from the "on" position to an "off" position to shut off the supply of air to the passage 53 (though not to the extreme "off" position shown in Fig. 7). This stops the operation of the device. During each reciprocation of the piston 18 a definite quantity of gasolene has been discharged from the discharge pipe 21 as determined by the capacity of the pump—in this case being assumed to be one gallon so that in the five strokes five gallons are discharged. The device is now ready for another automatic operation, for any desired number of strokes, the setting being obtained as before, by first moving the handle 71 to extreme "off" position, then turning the setting handle 107 first back to "0" position and then forward to the number corresponding to the number of strokes desired, and then turning the handle 71 to "on" position.

The setting handle 107 cannot be turned save when the main valve 71 is in extreme "off" position, because of the interlocking of the lever 105 and lug 106; and the handle 71 cannot be turned to extreme "off" position save when the sleeve 82 is in its lowermost position and the direction-controlling valve 43 is in its up-stroke-producing position (shown in Fig. 10), because of the interlocking of the toe 78 and tail 77.

I claim as my invention:

1. In combination, a reciprocating fluid pressure motor, a direction-controlling valve operated by said motor at the ends of the strokes thereof for reversing the direction of movement, a main valve controlling the supply of fluid pressure to said motor, setting means adjustable for different numbers of motor strokes and operating to shut the main valve at the end of a number of strokes corresponding to such setting, and interlocking means for preventing the operation of said setting means save when said main valve is shut.

2. In combination, a reciprocating fluid pressure motor, a direction-controlling valve operated by said motor at the ends of the strokes thereof for reversing the direction of movement, a main valve controlling the supply of fluid pressure to said motor, setting means adjustable for different numbers of motor strokes and operating to shut the main valve at the end of a number of strokes corresponding to such setting, and interlocking means for preventing the operation of said setting means save when the direction-controlling valve is in a predetermined position.

3. In combination, a reciprocating fluid pressure motor, a direction-controlling valve operated by said motor at the ends of the strokes thereof for reversing the direction of movement, a main valve controlling the supply of fluid pressure to said motor, setting means adjustable for different numbers of motor strokes and operating to shut the main valve at the end of a number of strokes corresponding to such setting, and interlocking means for preventing the operation of said setting means save when said main valve is shut and the direction-controlling valve is in a predetermined position.

4. A reciprocating fluid motor, comprising a cylinder, a piston slidably mounted therein, a direction-controlling valve controlling the direction of movement of said piston and operated by such movement, a main valve controlling the supply of fluid pressure, a ratchet member which when moved to a given position shuts said main valve, and a pawl coöperating with said ratchet member and operated by the reciprocations of said piston to move said ratchet member step by step toward such given position, said ratchet member being manually movable away from such given position.

5. A reciprocating fluid motor, comprising a cylinder, a piston slidably mounted therein, a direction-controlling valve controlling the direction of movement of said piston and operated by such movement, a main valve controlling the supply of fluid pressure, a ratchet member which when moved to a given position shuts said main valve, a pawl coöperating with said ratchet member and operated by the reciprocations of said piston to move said ratchet member step by step toward such given position, said ratchet member being manually movable away from such given position, and interlocking mechanism for preventing such movement of the ratchet member away from such given position save when the main valve is shut.

6. A reciprocating fluid motor, comprising a cylinder, a piston slidably mounted therein, a direction-controlling valve controlling the direction of movement of said piston and operated by such movement, a main valve controlling the supply of fluid pressure, a ratchet member which when moved to a given position shuts said main valve, a pawl coöperating with said ratchet member and operated by the reciprocations of said piston to move said ratchet member step by step toward such given position, said ratchet member being manually movable away from such given position, and interlocking mechanism for preventing such movement of the ratchet member away from such given position save when the direction-controlling valve is in a predetermined position.

7. A reciprocating fluid motor, comprising a cylinder, a piston slidably mounted therein, a direction-controlling valve controlling the direction of movement of said piston and operated by such movement, a main valve controlling the supply of fluid pressure, a ratchet member which when moved to a given position shuts said main valve, a pawl coöperating with said ratchet member and operated by the reciprocations of said piston to move said ratchet member step by step toward such given position, said ratchet member being manually movable away from such given position, and interlocking mechanism for preventing such movement of the ratchet member away from such given position save when the main valve is shut and the direction-controlling valve is in a predetermined position.

8. A reciprocating fluid motor, comprising a cylinder, a piston slidably mounted therein, a direction-controlling valve controlling the direction of movement of said piston and operated by such movement, a main valve controlling the supply of fluid pressure, a ratchet member which when moved to a given position shuts said main valve, a pawl coöperating with said ratchet member and operated by the reciprocations of said piston to move said ratchet member step by step toward such given position, and means for lifting said pawl clear of such ratchet member when said main valve is shut so as to permit setting of such ratchet member.

9. A reciprocating fluid motor, comprising a cylinder, a piston slidably mounted therein, a direction-controlling valve controlling the direction of movement of said piston and operated by such movement, a main valve controlling the supply of fluid pressure, a ratchet member which when moved to a given position shuts said main valve, a pawl coöperating with said ratchet member and operated by the reciprocations of said piston to move said ratchet member step by step toward such given position, a setting member having a slipping connection with said ratchet member for setting it, and interlocking means between said setting member and said main valve.

10. A reciprocating fluid motor, comprising a cylinder, a piston slidably mounted therein, a direction-controlling valve controlling the direction of movement of said piston and operated by such movement, a main valve controlling the supply of fluid pressure, a ratchet member which when moved to a given position shuts said main valve, a pawl coöperating with said ratchet member and operated by the reciprocations of said piston to move said ratchet member step by step toward such given position, and a setting member having a slipping connection with said ratchet member for setting it.

11. A reciprocating fluid motor, comprising a cylinder, a piston slidably mounted therein, a direction-controlling valve controlling the direction of movement of said piston and operated by such movement, a main valve controlling the supply of fluid pressure, a ratchet member which when moved to a given position shuts said main valve, a pawl coöperating with said ratchet member and operated by the reciprocations of said piston to move said ratchet member step by step toward such given position, a setting member having a slipping connection with said ratchet member for setting it when said pawl is raised to clear said ratchet member, and means for raising the pawl to clear the ratchet member only when said main valve is shut.

12. A reciprocating fluid motor, comprising a cylinder, a piston slidably mounted therein, a direction-controlling valve controlling the direction of movement of said piston and operated by such movement, a main valve controlling the supply of fluid pressure, a ratchet member which when moved to a given position shuts said main valve, a pawl coöperating with said ratchet member and operated by the reciprocations of said piston to move said ratchet member step by step toward such given position, a setting member having a slipping connection with said ratchet member for setting it when said pawl is raised to clear said ratchet member, means for raising the pawl to clear the ratchet member only when said main valve is shut, and interlocking means for preventing movement of said setting member when said main valve is open.

13. A power motor, comprising two relatively movable parts, a control device for controlling the supply of power to such motor, a member which when moved to a given position operates such control device to shut off the power, means coöperating with said member and operated by predetermined relative movements of the two relatively movable parts of the motor to move said member toward said given position, said member being manually movable away from such given position, and interlocking mechanism between said control device and said member.

14. A power motor, comprising two relatively movable parts, a control device for controlling the supply of power to such motor, a member which when moved to a given position operates such control device to shut off the power, means coöperating with said member and operated by predetermined relative movements of the two relatively movable parts of the motor to move said member toward said given position, a setting device having a slipping connection with said member for setting it, and interlocking means between said setting device and said control device.

15. A power motor, comprising two relatively movable parts, a control device for controlling the supply of power to such motor, a member which when moved to a given position operates such control device to shut off the power, means coöperating with said member and operated by predetermined relative movements of the two relatively movable parts of the motor to move said member toward said given position, and a setting device having a slipping connection with said member for setting it.

In witness whereof, I have hereunto set my hand at Milwaukee, Wisconsin, this 20th day of March, A. D. one thousand nine hundred and seventeen.

HERBERT W. CHENEY.